United States Patent [19]

Cheape, Jr. et al.

[11] 4,153,787
[45] May 8, 1979

[54] METHOD FOR REMOVING UNREACTED MONOMERS FROM A SLURRY

[75] Inventors: Dudley W. Cheape, Jr., Decatur; Charles E. Bankston, Trinity, both of Ala.

[73] Assignee: Monsanto Company, Decatur, Ala.

[21] Appl. No.: 889,170

[22] Filed: Mar. 23, 1978

[51] Int. Cl.$^2$ .............................................. C08F 6/00
[52] U.S. Cl. ................................ 528/500; 260/32.6 R
[58] Field of Search ........................................ 528/500

[56] References Cited

U.S. PATENT DOCUMENTS 3,454,542   7/1969   Cheape et al. ...................... 528/500

*Primary Examiner*—Stanford M. Levin
*Attorney, Agent, or Firm*—Robert L. Broad, Jr.

[57] ABSTRACT

In a process wherein an acrylonitrile polymerization slurry made up of polymer solids, unreacted monomers and water is passed downward through a column containing a plurality of perforated trays for the purpose of removing unreacted monomers from the slurry, the improvement comprising: sequentially applying sprays of water to that portion of the inner wall of the column above each of the trays, with each such wall portion being sprayed by at least two sprays positioned to substantially cover that wall portion and with the sprays being operated intermittently in such a sequence that only one of the sprays is in operation at a given time and all sprays in the column are operated within a period of less than about 15 minutes, preferably less than five minutes. In the sequence, each spray is operated for a time period of at least about five seconds.

4 Claims, 1 Drawing Figure

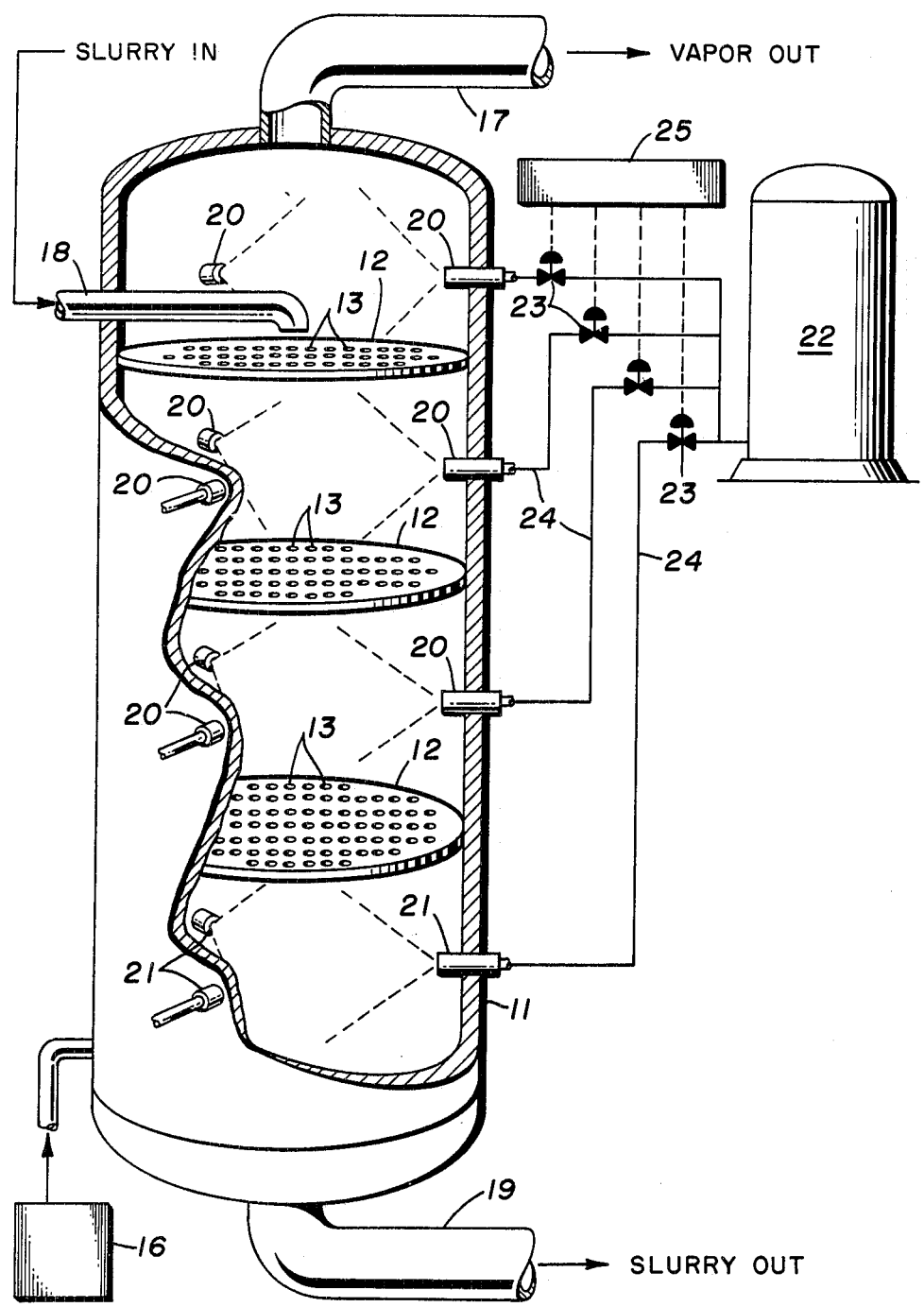

METHOD FOR REMOVING UNREACTED MONOMERS FROM A SLURRY

BACKGROUND OF THE INVENTION a. Field of the Invention

This invention relates to methods for removing unreacted monomers from polymerization slurries.

b. Description of the Prior Art

In the manufacture of acrylic polymers to be used in forming filaments, it is necessary to remove polymer solids from a liquid phase which may be made up of unreacted monomers or a mixture of unreacted monomers and water. This can be achieved by passing the slurry downward through a column while countercurrently passing steam upward through the column to strip off unreacted monomers and/or water. After the water and unreacted monomers have been separated from the polymer solids, the polymer solids are dried for later use. In such later use, the dry polymer is dissolved in a solvent to form a spinning dope which is passed through a filter to a spinnerette. One of the problems involved with prior art processes is the fact degraded polymer will be formed in the system and this degraded polymer will not dissolve sufficiently in the solvent, remaining in solid form to clog the filter. This results in extremely short filter life. It has been found that as little as 0.07 weight percent of degraded polymer in the polymer going to make up the spinning dope will result in a 10 to 20 fold reduction in filter life.

It has been found that any polymer solids which may find their way into contact with the inner wall of the column may tend to cling and, under the temperatures involved, become degraded within a short time period. In this invention, degradation of polymer solids is prevented, so that filter life is greatly extended.

SUMMARY OF THE INVENTION

In a process wherein an acrylonitrile polymerization slurry made up of polymer solids, unreacted monomers and water is passed downward through a column containing a plurality of perforated trays for the purpose of removing unreacted monomers from the slurry, the improvement comprising: sequentially applying sprays of water to that portion of the inner wall of the column above each of the trays, with each wall portion being sprayed by at least two sprays positioned to substantially cover that portion of the wall and with the sprays being operated intermittently in such a sequence that only one of the sprays is in operation at a given time and all sprays in the column are operated within a period of less than about 15 minutes. Preferably, the sequence takes place within a time period of about five minutes, with each spray being active for a period of at least five seconds.

BRIEF DESCRIPTION OF THE DRAWING

The drawing shows a fragmentary perspective view of a column which may be used in carrying out the present invention, showing the positioning of spray nozzles used in the process of this invention.

DETAILED DESCRIPTION OF THE INVENTION

Referring now in detail to the drawing, there is shown a column 11 which is useful in carrying out the process of the present invention. The column 11 is provided with spaced trays 12 which are provided with apertures 13 through which a polymerization slurry passes as it moves downward through the column 11. Steam from a supply 16 is passed into the lower end of the column 11 and passes upward, countercurrent to the slurry flow, through the column 11 and is taken off through outlet line 17 along with unreacted monomers in vapor form which have been stripped from the slurry. The slurry is fed into the column through inlet line 18 and is withdrawn from the column 11 through outlet line 19.

The column 11 is provided with a plurality of sets of spray nozzles 20 positioned as shown in the drawing, these nozzles being secured to the wall of the column 11. It will be apparent from the drawing that there are at least two nozzles, in each set, positioned to cover that portion of the inner wall of the column 11 above each of the trays 12, with the preferred number of nozzles in a set being three. The column 11 is also provided with a set of three additional nozzles 21 positioned below the lowermost tray 12 in the column. The sprays 20 are so positioned that sprays from the nozzles 20 will cover substantially all of the entire inner wall surface of the column 11.

Water under pressure is supplied from a supply 22 through air activated ball valves 23 and lines 24 to the individual nozzles, the line to each nozzle being provided with a valve 23. A control system 25 of a conventional type is utilized to operate the valves 23 in a timed sequence. This sequence is such that only one nozzle is operated at any given time and all of the nozzles are operated within a time period of fifteen minutes, preferably five minutes. Each spray is operated for a time interval of at least about five seconds.

It is undesirable to introduce too much water into the system via the sprays. An excess of water over what is actually needed will require that much excess energy when the water is later removed to produce a dry polymer. The amount of water introduced into the system through the sprays should be 10–30 weight percent of the slurry weight, preferably 10–20 weight percent.

The slurry to be treated is a slurry resulting from the polymerization of acrylonitrile with other mono-olefinic monomers in a conventional process. This polymerization reaction may take place in the presence of water as a suspension polymerization process or in the presence of unreacted monomers without water in a bulk polymerization process. Typically, the polymer formed in this polymerization process will be composed of at least about 35 weight percent acrylonitrile, with the remainder being other mono-olefinic monomers copolymerizable with acrylonitrile. Other mono-olefinic monomers which are copolymerizable with acrylonitrile, such as vinyl bromide, vinylidene chloride, vinyl acetate and others, are well known.

The polymerization slurry passed downward through the column 11 will be made of 8 to 22 weight percent polymer solids, 3 to 10 weight percent unreacted mono-olefinic monomers and 68 to 89 weight percent water, when a suspension polymerization process is used. The slurry will also contain a negligible amount of catalyst fragments and other additives. These have no effect on the process of the present invention.

COMPARATIVE EXAMPLE I

An acrylonitrile polymerization process was carried out in a reaction vessel having an outlet valve which is such that pressure is maintained in the vessel while portions of the finished polymerization slurry are drawn off. The polymerization slurry was made up of about 12 weight percent polymer solids and five weight percent unreacted monomers with the remainder being water. The slurry was passed downward through a tray column as steam was fed upward to the column countercurrent to slurry flow to strip off unreacted monomers. The slurry, essentially free of unreacted monomer, was drawn off the bottom of the column and was then cooled and filtered in a rotary vacuum filter. The wet polymer from the rotary vacuum filter was repulped with water and then filtered on another rotary filter. The wet polymer from the second filter was pellitized and then dried and ground into smaller particles of polymer. The dried polymer was transferred to a dope spinning preparation area where the polymer and a cold solvent (dimethylacetamide) were mixed to form a spinning solution. The spinning solution was passed through a filter press and was then pumped to a spinning area where it was heated by a heat exchanger, filtered through pot filters and then passed through a spinnerette to form filaments.

By the time 70,000 pounds of spinning solution had been passed through the filter press, the filter press was so clogged that the system had to be shut down. This occurred in a period of less than 16 hours.

EXAMPLE II

Example I was repeated and the water sprays of this invention were used. The water was applied at varying rates from 12 to 20 gallons per minute and at varying pressures ranging from 25 to 60 psig, with the total amount of water sprayed being about 30 percent of slurry weight. The nozzles were controlled in such a manner that only one spray was in operation at a given time, with the spray from each nozzle lasting only about 5 seconds. The spraying sequence was such that the sequence was initiated from the top of the column where the uppermost three sprays were operated sequentially and then the next three sprays down the column were operated sequentially until all of the sprays had been actuated whereupon the uppermost sprays were again actuated. The entire sequence took place in about 3.5 minutes.

Using this process, press filter life was more than doubled. Unreacted monomers were reduced to less than .5 ppm.

What is claimed is:

1. In a process wherein an acrylonitrile polymerization slurry made up of 8 to 22 weight percent polymer solids, 3 to 10 weight percent unreacted mono-olefinic monomers and 89 to 68 weight percent water is passed downward through a column containing a plurality of perforated trays and steam is passed upward through the trays in a direction countercurrent to the direction of slurry flow for the purpose of removing unreacted monomers from the slurry, the improvement comprising:
   a. sequentially applying sprays of water to that portion of the inner wall of the column above each of said trays, each said portion being sprayed by at least two sprays positioned to substantially cover said portion with said water spray, the total amount of water sprayed being 10–30 percent of the slurry weight.
   b. operating the sprays intermittently in such a sequence that only one of said two sprays is in operation at a given time and that all sprays are operated within a period of less than about 15 minutes.

2. The process of claim 1 wherein only one spray in the column is in operation at a given time and each spray is operated for at least 5 seconds.

3. The process of claim 2 wherein each of said portions are sprayed by at least 3 sprays, said sprays being uniformly spread around said wall portion.

4. The process of claim 3 wherein sprays of water are applied to the walls of the column below the lowermost tray in said column.

* * * * *